United States Patent
Van Rijnswou

(10) Patent No.: US 8,265,265 B2
(45) Date of Patent: Sep. 11, 2012

(54) CIRCUIT ARRANGEMENT AND METHOD FOR RSA KEY GENERATION

(75) Inventor: Sander Matthijs Van Rijnswou, Veldhoven (NL)

(73) Assignee: NXP B.V., Eindhoven (NL)

( * ) Notice: Subject to any disclaimer, the term of this patent is extended or adjusted under 35 U.S.C. 154(b) by 505 days.

(21) Appl. No.: 12/063,865

(22) PCT Filed: Aug. 9, 2006

(86) PCT No.: PCT/IB2006/052741
§ 371 (c)(1),
(2), (4) Date: Aug. 14, 2008

(87) PCT Pub. No.: WO2007/020564
PCT Pub. Date: Feb. 22, 2007

(65) Prior Publication Data
US 2009/0185681 A1    Jul. 23, 2009

(30) Foreign Application Priority Data
Aug. 19, 2005    (EP) .................... 05107615

(51) Int. Cl.
*H04K 1/00*    (2006.01)
*H04L 9/00*    (2006.01)
(52) U.S. Cl. .......................... 380/28; 380/44
(58) Field of Classification Search ............ 380/28, 380/44
See application file for complete search history.

(56) References Cited

U.S. PATENT DOCUMENTS

| | | | |
|---|---|---|---|
| 4,471,164 A * | 9/1984 | Henry | 380/30 |
| 5,289,542 A * | 2/1994 | Kessler | 380/257 |
| 5,406,628 A * | 4/1995 | Beller et al. | 380/30 |
| 5,724,425 A * | 3/1998 | Chang et al. | 705/52 |
| 5,946,397 A | 8/1999 | M'Raihi et al. | |
| 5,991,415 A * | 11/1999 | Shamir | 380/30 |
| 6,330,332 B1 | 12/2001 | Itoh et al. | |
| 6,411,715 B1 * | 6/2002 | Liskov et al. | 380/277 |
| 6,666,381 B1 * | 12/2003 | Kaminaga et al. | 235/492 |
| 7,191,333 B1 * | 3/2007 | Maddury et al. | 713/174 |
| 7,386,728 B1 * | 6/2008 | Lang et al. | 713/176 |
| 2002/0188846 A1 * | 12/2002 | Levy | 713/170 |
| 2003/0028771 A1 * | 2/2003 | Kocher et al. | 713/172 |

(Continued)

FOREIGN PATENT DOCUMENTS
WO    0108350 A1    2/2001

OTHER PUBLICATIONS

Philips Semiconductors: "SMARTMX P5CC009 Secure Smart Card Controller P5CC009 Objective Specification Revision 1.0" Apr. 8, 2003, pp. 1-11 Downloaded From: http://www.nxp.com/acrobat_download/other/identification/sfs082910.pdf.

(Continued)

*Primary Examiner* — Techane Gergiso

(57) ABSTRACT

In order to further develop a circuit arrangement for as well as a method of performing at least one operation, in particular at least one cryptographic calculation, wherein the problem of creating at least one key, in particular the R[ivest-]S[hamir-]A[dleman] key, satisfying at least one defined digital signature laws, in particular satisfying the German Digital Signature Law, is solved it is proposed that at least one, preferably two, prime numbers (p; q) for key generation, in particular for R[ivest-]S[hamir-]A[dleman] key generation, are searched in compliance with at least one defined digital signature law, in particular with the German Digital Signature Law.

8 Claims, 1 Drawing Sheet

U.S. PATENT DOCUMENTS

| | | | |
|---|---|---|---|
| 2003/0235299 A1 | 12/2003 | Dupaquis | |
| 2004/0030903 A1* | 2/2004 | Hicks et al. | 713/176 |
| 2004/0049526 A1* | 3/2004 | Joye et al. | 708/250 |
| 2004/0156506 A1 | 8/2004 | Sanchez | |
| 2004/0184604 A1* | 9/2004 | Joye et al. | 380/30 |
| 2005/0027764 A1 | 2/2005 | Agrawal et al. | |
| 2005/0039018 A1* | 2/2005 | Wittkotter | 713/176 |

OTHER PUBLICATIONS

Bundesnetzagentur Fur Elektrizitat, Gas, Telekommunikation, Post Und Eisenbahnen: "Bekanntmachung Zur Elektronischen Signatur Nach Dem Signaturgesetz Und Der Signaturverordnung" Bundesanzeiger, No. 58, Mar. 23, 2006, pp. 1913-1915.

Feyt, Nathalie; et al "Off-Line/On-Line Generation of RSA Keys With Smart Cards" S. -P Shieh, Ed., 2nd International Workshop for Asian Public Key Infrastructurestaipei, Taiwan, Nov. 1, 2002, pp. 153-158 Downloaded From: http://citeseer.ist.psu.edu/745430.html.

Chenghuai, Lu; et al "Implementation of Fast RSA Key Generation on Smart Cards" SAC 2002, Madrid Spain, pp. 214-220 Downloaded From: http://portal.acm.org/citation.cfm?id=508791.508837.

Ueli M. Maurer: "Fast Generation of Prime Numbers and Secure Public-Key Cryptographic Parameters" Journal of Cryptology, Nov. 14, 1994, pp. 1-35 Downloaded From: http://citeseer.ist.psu.edu/186041.html.

Joye, Marc; et al "Constructive Methods for Generation of Prime Numbers" S. Murphy, Ed. Proc. of 2nd Open Nessie Workshop, Egham UK, Sep. 12, 2001, pp. 1-5 Downloaded From: http://citeseer.ist.psu.edu/617261.html.

Joyce, M; et al "Efficient Generation of Prime Numbers" Cryptographic Hardware and Embedded Systems. 2nd International Workshop, CHES 2000, 2000 Proceedings, Lecture Notes in Computer Science, Berlin, vol. 1965, Aug. 17, 2000, pp. 340-354.

* cited by examiner

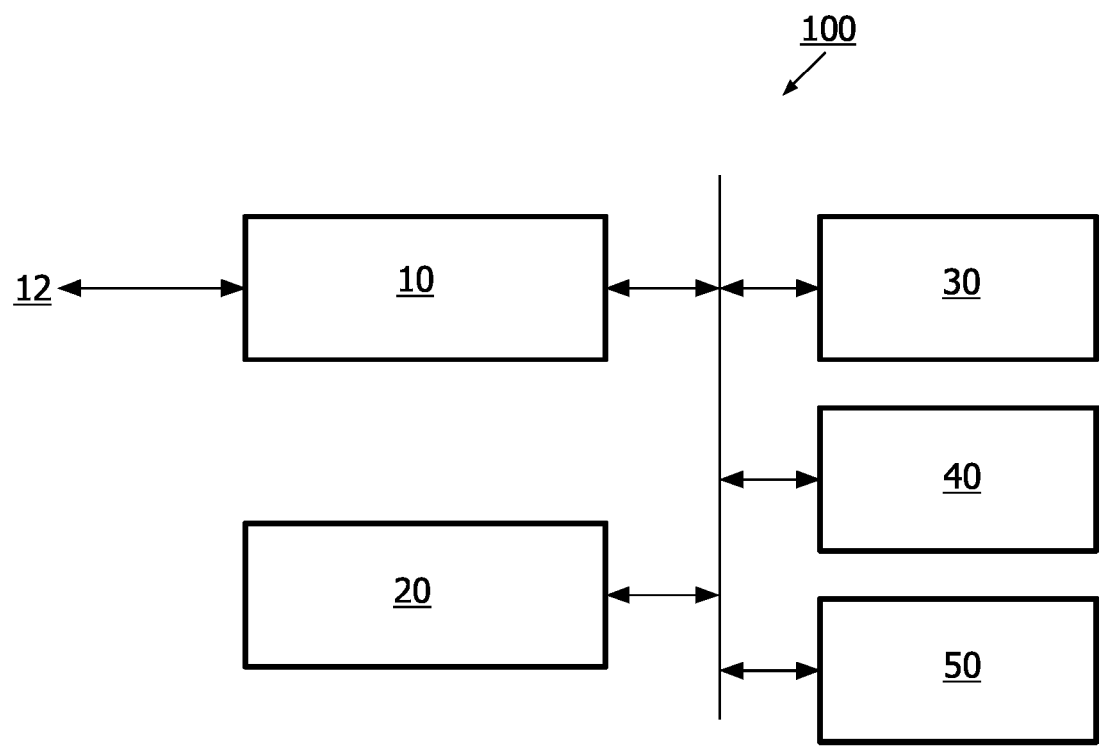

CIRCUIT ARRANGEMENT AND METHOD FOR RSA KEY GENERATION

FIELD

The present invention relates to a circuit arrangement, in particular to an integrated circuit, such as to a mathematical coprocessor, for performing at least one operation, in particular at least one cryptographic calculation.

The present invention further relates to a method of performing at least one operation, in particular at least one cryptographic calculation.

BACKGROUND

In cryptography, the currently most used public key system is R[ivest-]S[hamir-]A[dleman]. This is a system allowing to sign with a secret private key but this signature can be verified by anyone in possession of the non-secret public key. The RSA system or RSA algorithm requires specially constructed keys to work; in particular, two large prime numbers are required, the product of which is the so-called mod[ulus].

In some countries, laws have been passed giving the digital signature a similar legal status as ordinary signatures; for example, in Germany the "German Digital Signature Law" has been passed giving the digital signature a similar legal status as ordinary signatures. For security reasons, such laws pose a number of requirements on the keys being used, such as with respect to the key length. But also the following more technical requirement is given:

The prime factors or prime numbers p, q of n should have the same order of magnitude but should not be too close together:

$$\epsilon_1 < |\log_2(p) - \log_1(q)| < \epsilon_2.$$

Proposed here as a guide for $\epsilon_1$ and $\epsilon_2$ are $\epsilon_1 \approx 0.5$ and $\epsilon_2 \approx 30$.

The prime factors p and q have to be generated randomly and independently of one another, observing the given constraints (cf. http://regtp.de/imperia/md/content/tech reg t/digsign/141.pdf).

Having a system working in accordance with the German Digital Signature Law is a business necessity, in fact not only for the German market but increasingly for the European and worldwide market.

Generating prime numbers for R[ivest-]S[hamir-]A[dleman] works by generating a random number of sufficient length and then applying the operator "NextPrime" to it. To this approach, there was already known a small improvement, namely to insure that the product of the two primes so produced are precisely of a certain length thus allowing to modify the first few bits of the random numbers.

However, it is a problem to generate primes satisfying the above requirement of the German Digital Signature Law. One approach having been used elsewhere is to produce these random numbers, check if they satisfy the requirement and, if not, produce new random numbers. This can be continued until the produced random number would satisfy all conditions.

Obviously this approach has numerous problems. First of all, it is unclear how long it takes to get good random numbers by chance. Secondly, many random numbers are required (which is a scarce resource in some environments, such as smart cards or certain types of servers). Thirdly, complex software is required to do the necessary computations (which is undesirable for several reasons).

Prior art document US 2004/0049526 A1 refers to a method for generating a random prime number within a pre-determined interval; a single value being used to generate prime numbers is pre-calculated and stored.

Prior art article "Off-line/On-line Generation of RSA Keys with Smart Cards" by Nathalie Feyt, Marc Joye, David Naccache, and Pascal Paillier, Second International Workshop for Asian Public Key Infrastructures, Taipei, Taiwan, Oct. 30, 2002, to Nov. 1, 2002, discloses a division of the RSA key generation into two phases.

The first phase is performed off-line, before the input parameters are even known; the second phase is performed on-line by the smart card once the input parameters are known, and is meant to be very fast.

By this known technique, an online generation of RSA keys of arbitrary length is achieved from a small set of seeds computed during the off-line phase. Thus, a mixed offboard/on-board solution is presented where the variable and time-consuming part is performed off-line by producing small seeds being used in the second, fast, on-line part of the generation of the keys themselves.

Another solution according to this prior art article consists in pre-computing values for the primes p, q for various pairs and to store those values in an E[lectrically]E[rasable]P[rogrammable]R[ead]O[nly]M[emory]-like, non volatile memory.

A very natural yet cumbersome solution according to this prior art article consists in precomputing and writing in the card's non-volatile memory a set of integer values such that for each i a P[seudo-]R[andom]N[umber]G[enerator] yields a prime number.

Regarding the technological background of the present invention, reference can be made to prior art document U.S. Pat. No. 5,946,397 revealing a method of cryptography with public key based on the discrete logarithm; a database of random values is formed and these random values are combined to determine exponents for keys.

Prior art document US 2004/0156506 A1 relates to selecting cached RSA keys in response to RSA key requests.

Regarding the technological background of the present invention, further reference can be made to prior art article "Implementation of Fast RSA Key Generation on Smart Cards" by Chenghuai Lu, Andre L. M. dos Santos, and Francisco R. Pimentel, Proceedings of the 2002 ACM symposium on Applied computing, Madrid, Spain.

Starting from the disadvantages and shortcomings as described above, in particular starting from the requirements of certain digital signature laws, such as from the requirements of the German Digital Signature Law, and taking the prior art as discussed into account, an object of the present invention is to further develop a circuit arrangement of the kind as described in the technical field as well as a method of the kind as described in the technical field in order to enable the solution of the problem of creating at least one key, in particular the R[ivest-]S[hamir-]A[dleman] key, satisfying these digital signature laws, in particular satisfying the German Digital Signature Law.

BRIEF SUMMARY

The object of the present invention is achieved by a circuit arrangement comprising the features of claim 1 as well as by a method comprising the features of claim 5. Advantageous embodiments and expedient improvements of the present invention are disclosed in the respective dependent claims.

The present invention is principally based on the idea of accelerating the key generation, in particular for creating R[ivest-]S[hamir-]A[dleman] keys satisfying the German Digital Signature Law, in a much better way than previous methods, i.e. faster, less complex and also introducing very little bias.

According to the teaching of the present invention, the following algorithm for the prime searching process for key generation can be implemented:

offline, all possible start bytes for the random numbers being the basis for the primes are computed such that they satisfy all requirements of the respective digital signature law, for example all requirements of the German Digital Signature Law;

in the R[ivest-]S[hamir-]A[dleman] key generating stage, these pre-computed values are used to start the random numbers used in the prime searching process.

The present invention further relates to a data processing device, in particular to an embedded system, for example to a chip card or to a smart card, comprising at least one circuit arrangement, in particular at least one integrated circuit, such as at least one mathematical coprocessor, carrying out the calculations, in particular the cryptographic calculations, of the above-described type.

The present invention further relates to a computer program product directly loadable into the memory of at least one computer, comprising at least one software code portion for performing the method of the above-described type when said computer program product is run on the computer.

The present invention further relates to the electronic distribution of at least one computer program product of the above-described type.

The present invention finally relates to the use of at least one circuit arrangement, in particular of at least one integrated circuit, such as of at least one mathematical coprocessor, of the above-described type and/or of the method of the above-described type in at least one data processing device, in particular in at least one embedded system, for example in at least one chip card or a smart card, of the above-described type in the field of public key cryptography, such as banking, online shopping, security, etc.

Correspondingly, the present invention can be used in any field where public key cryptography is used, such as banking, online shopping, security, etc. The light weight of the algorithm makes it especially suited to restricted environments, such as chip cards or smart cards.

As already discussed above, there are several options to embody as well as to improve the teaching of the present invention in an advantageous manner. To this aim, reference is made to the claims respectively dependent on claim 1 and on claim 5; further improvements, features and advantages of the present invention are explained below in more detail with reference to a preferred embodiment by way of example and to the accompanying drawings where FIG. 1 schematically shows a block diagram of an embodiment of a data processing device comprising a circuit arrangement according to the present invention by means of which the method according to the present invention can be carried out.

The embodiment of a data processing device 100, namely an embedded system in the form of a chip card or of a smart card comprising an I[ntegrated]C[ircuit] carrying out calculations, namely cryptographic operations, refers to a P[ublic] K[ey]I[nfrastructure] system and works according to the method of the present invention.

DETAILED DESCRIPTION

In this context, a system to produce prime numbers p, q needed for R[ivest-]S[hamir-]A[dleman] keys satisfying certain digital signature laws, for example the German Digital Signature Law, is described. Moreover, this system does not require additional random numbers, is very fast, and needs only a quite simple program algorithm.

The essential idea of the present invention is to use a pre-computed table of bytes with which the random numbers can be safely started; these started random numbers can start the prime searching process.

By this way of proceeding, the present invention overcomes the problems which were introduced when particular digital signature laws, especially the German Digital Signature Law, imposed detailed restrictions on RSA keys. As shown in the chapter "Background and prior art" above, previous methods were burdensome and unsuitable for restricted environments, such as smart cards.

Using the present invention, RSA key generation is again possible wherein the algorithm works as follows:

Offline, all possible bytes are computed with which the random numbers can be started that are the basis for the primes, and still guarantee that these primes satisfy all the requirements.

Next, when generating RSA keys, these pre-computed values are used to start the random numbers with. Below an in depth description is given, where first the precise conditions to be satisfied (including those of the German Digital Signature Law) are given, next it is gone into a discussion on what these conditions lead to, and finally, the algorithm as it can be implemented is given.

For generating RSA keys, primes p and q are to be produced, these primes p and q being subject to the following conditions to be satisfied (including those of the German Digital Signature Law):

$$2^{2n-1} < p*q < 2^{2n};  \quad (i)$$

$$0.5 < |\log(p) - \log(q)| < 30 \text{ (signature law condition)}; \quad (ii)$$

$$p < q; \quad (iii)$$

$$p < 2^n \text{ and } q < 2^n. \quad (iv)$$

In these four inequalities (i), (ii), (iii), (iv), the number 2*n presents the required bit length of the mod[ulus], that is p*q.

The first condition (i) expresses the fact that the mod[ulus] p*q is to be precisely of the required bit length.

The second condition (ii) is imposed by the German Digital Signature Law.

The third condition (iii) is for convenience.

The fourth condition (iv) is also for convenience and expresses the fact that also the individual primes are to be precisely of the bit length n. This is not strictly speaking necessary from requirements of the German Digital Signature Law but it makes handling these numbers easier.

Since one of the two primes p, q is going to end up smaller that prime is to be labeled (this makes use of the key in Chinese Remainder applications more easy).

Finally, also the condition can be added that no more biases in the choice of primes than necessary are imposed.

After having defined the precise conditions to be satisfied (including those of the German Digital Signature Law), next the question can be asked what restriction can be imposed upon the first byte of the prime numbers p and q such that the four conditions (i), (ii), (iii), (iv) listed above are automatically satisfied, for the whole of p and q.

Using the appropriate mathematics it turns out that the following list of conditions is sufficient wherein the first byte of p and q is abbreviated with p_8 and q_8:

$$2^{15} < p\_8 * q\_8; \quad \text{(a)}$$

$$(p\_8+1) * 2^{0.5} <= q\_8; \quad \text{(b)}$$

$$2^7 < p\_8 < q\_8 < 2^8. \quad \text{(c)}$$

When solving this system of equations (a), (b), (c), the result is a list of 1.040 solutions, i.e. of 1.040 pairs of bytes (p_8, q_8) which can potentially occur at the start of suitable prime numbers. Concerning these pairs of bytes (p_8, q_8), the following observation may be made:

there are only solutions with q_8 in the range $217 <= q\_8 <= 255$;

given a q_8 for which a solution exists, the highest p_8 being valid is given by the floor of q_8*(181/256)−1;

the following list of numbers represents the number of solutions p_8 given q_8 (starting at q_8=217 and up to q_8=255):

1, 3, 4, 6, 7, 8, 10, 11, 13, 14, 15, 17, 17, 19, 21, 22, 23, 24, 26, 27, 28, 30, 30, 32, 34, 35, 36, 37, 39, 39, 41, 42, 44, 44, 46, 47, 48, 49, 51

From this, an algorithm can be straightforwardly designed:

This algorithm takes as input a random number R, and produces as output two bytes p_8 and q_8 which can be used as the first bytes of a string of random bytes, to which in turn the next prime operator can be applied.

```
Let R = R mod (1040)
sum = 0; N = 0;
while ( sum < R ) {
sum += top [N]
N++;
}
N−−;
remainder = sum − R
q_8 = 217 + N
p_8 + (q_8*181) / 256 − 1 − remainder;
```

Finally, FIG. 1 shows a block diagram of a hardware implementation of a data processing device, namely of a smart card 100 comprising a circuit arrangement according to the present invention by means of which the above-described method according to the present invention including the above-described algorithm according to the present invention can be carried out.

The smart card 100 comprises the following components:

a microcontroller 10 for general control to communicate with the outside world via an interface 12, for example according to ISO-7816-3 standard; the microcontroller 10 sets pointers for data in R[andom]A[ccess]M[emory]/R[ead]O[nly]M[emory] and starts the coprocessor 20;

a R[ead]O[nly]M[emory] 30 for the program of the microcontroller 10;

a P[rogrammable]R[ead]O[nly]M[emory] (flash memory or E[lectrically]E[rasable]P[rogrammable]R[ead]O[nly]M[emory]) 40 for the non-volatile storage of data and/or of programs;

a R[andom]A[ccess]M[emory] 50 for the volatile storage of data, for instance for the storage of intermediate results during calculations; and a coprocessor 20 dedicated to perform special high-speed tasks for E[lliptic]C[urve]C[ryptography] calculations, in particular for E[lliptic]C[urve]D[igital]S[ignature]A[lgorithm] calculations, or for R[ivest-]S[hamir-]A[dleman] calculations.

When a task is ready, control is returned to the microcontroller 10.

In a variant, the present invention is implemented in software with at least one microprocessor A[rithmetic]L[ogical]U[nit] to provide add operations, subtract operations, and/or shift operations with programming of the controller to provide control logic, and degree detection by shift registers.

The above-specified algorithm as well as the above-specified hardware implementation as well as the above-specified software implementation can be used in the crypto library for the next generation eight bit smart card, the so-called SmartMX.

Fully compatible with the MIFARE PROX range, SmartMX meets the needs of high-volume, cost-sensitive, single-application and multi-application markets, such as banking cards, S[ubscriber]I[dentity]M[odule] cards, pay T[ele]V[ision] subscription cards, e-business, e-government and public transportation.

Offering large E[lectrically]E[rasable]P[rogrammable]R[ead]O[nly]M[emory] capacities (up to 72 K[ilo]B[ytes]) and high levels of security, the SmartMX dual/triple interface family members meet and exceed the specifications for smart passports (M[achine-]R[eadable]T[ravel]D[ocuments]) set by the International Civil Aviation Organization (ICAO).

SmartMX card I[ntegrated]C[ircuit]s feature exception sensors for voltage, frequency, temperature and light. In conjunction with handshake solutions' design methodology, this makes the entire family extremely resistant to any kind of physical analysis.

A hardware memory management unit (firewall) provides additional protection for P[ublic]K[ey]I[nfrastructure] controllers. The SmartMX family has been evaluated to ensure the highest security standards and includes the first I[ntegrated]C[ircuit]s for smart passports which have achieved C[ommon]C[riteria]E[valuation]A[ssurance]L[evel]5+[augmented] certification.

SmartMX is the most advanced solution available in its targeted segment, combining exceptionally powerful coprocessors for P[ublic]K[ey]I[nfrastructure] and secret key encryption to support R[ivest-]S[hamir-]A[dleman], E[lliptic]C[urve]C[ryptography], D[ata]E[ncryption]S[tandard], and A[dvanced]E[ncryption]S[tandard], with the high-security, low-power, performance-optimized design concept of handshake solutions technology.

SmartMX enables trouble-free implementations of operating systems and open platform solutions including Java Open Platform and MULT[i-application-card]O[perating]S[ystem] (=smart card operating system aimed at operating multiple applications off a single chip card), while offering an optimized feature set and the highest security.

SmartMX microcontrollers can be manufactured using advanced 0.18 micrometer, five metal layer C[omplementary]M[etal]O[xide]S[emiconductor] process technology and support class "C", class "B" and class "A" voltage ranges (1.8 Volt to five Volt), as required by application standards such as 3[rd]G[eneration]P[artnership]P[roject] for 3[rd]G[eneration] mobile communications and the E[uropay]M[asterCard]V[is a] credit card/debit card standard.

SmartMX is based on a proven secure C51-compatible architecture offering a wide choice of interface options (I[nternational]S[tandardization]O[rganization] 7816, I[nternational]S[tandardization]O[rganization] 14443 and U[niversal]S[erial]B[us] 2.0) and is available with cryptographic coprocessors for 3-D[ata]E[ncryption]S[tandard] algorithms and optional A[dvanced]E[ncryption]S[tandard] algorithms and a crypto accelerator called FrameXE for P[ublic]K[ey]I[nfrastructure] algorithms.

List of Reference Numerals
100 data processing device, in particular embedded system, for example chip card or smart card
10 microcontroller unit
12 interface unit of microcontroller unit 12
20 coprocessor unit
30 R[ead]O[nly]M[emory] unit
40 P[rogrammable]R[ead]O[nly]M[emory], in particular flash memory or E[lectrically]E[rasable]P[rogrammable]R[ead]O[nly]M[emory]
50 R[andom]A[ccess]M[emory]

The invention claimed is:

1. A hardware implementation of a data processing device, the data processing device comprising at least one integrated circuit (IC), wherein the at least one IC has start bytes of random numbers offline pre-computed from a table of bytes to satisfy requirements of a defined digital signature law, uses the pre-computed start bytes in a key generating stage to start the random numbers, and searches two prime numbers for key generation both in compliance with the defined digital signature law and based upon the started random numbers.

2. The data processing device of claim 1, wherein the data processing device is an embedded system.

3. The data processing device of claim 1, wherein the at least one IC carries out a cryptographic calculation.

4. A method of performing, on a hardware implementation of a data processing device, at least one cryptographic calculation, the method comprising:
searching, on the hardware implementation of a data processing device, two prime numbers for key generation in compliance with at least one defined digital signature law;
pre-computing start bytes for random numbers offline from a table of bytes to satisfy all requirements of the defined digital signature law; and
using, in a key generating stage, the pre-computed start bytes to start the random numbers used in searching for the two prime numbers.

5. The method according to claim 4, wherein the two prime numbers (p; q) are subject to the following condition:

$$2^{2n-1} < p*q < 2^{2n},$$

wherein p*q is a modulus having a required bit length 2*n.

6. The method of claim 4, wherein both prime numbers are of length n.

7. The method of claim 4, further comprising:
determining which prime number of the two prime numbers is smaller; and
applying a label to the smaller prime number.

8. A method of performing, on a hardware implementation of a data processing device, at least one cryptographic calculation, the method comprising:
searching, on the hardware implementation of a data processing device, two prime numbers for key generation in compliance with at least one defined digital signature law;
pre-computing all start bytes for random numbers to satisfy all requirements of the defined digital signature law; and
using, in a key generating stage, the pre-computed start bytes to start the random numbers used in searching for the two prime numbers, wherein the two prime numbers (p; q) to be produced are subject to the following conditions:

$$2^{2n-1} < p*q < 2^{2n}; \tag{i}$$

$$0.5 < |\log(p) - \log(q)| < 30; \tag{ii}$$

$$p < q; \text{ and} \tag{iii}$$

$$p < 2^n \text{ and } q < 2^n, \tag{iv}$$

wherein p*q is a modulus having a required bit length 2*n and each prime number has a bit length n.

* * * * *